United States Patent
Winterowd

(10) Patent No.: US 6,808,750 B2
(45) Date of Patent: Oct. 26, 2004

(54) LABELING PAINT FOR USE WITH METALLIC STENCILS ON ORIENTED STRANDBOARD FINISHING LINE

(75) Inventor: Jack G. Winterowd, Puyallup, WA (US)

(73) Assignee: Weyerhaeuser Company, Federal Way, WA (US)

( * ) Notice: Subject to any disclaimer, the term of this patent is extended or adjusted under 35 U.S.C. 154(b) by 20 days.

(21) Appl. No.: 10/405,389

(22) Filed: Apr. 2, 2003

(65) Prior Publication Data

US 2003/0212190 A1 Nov. 13, 2003

Related U.S. Application Data

(62) Division of application No. 09/829,508, filed on Apr. 9, 2001.
(60) Provisional application No. 60/207,085, filed on May 25, 2000.

(51) Int. Cl.⁷ .............................. B05D 1/32; B05D 7/06
(52) U.S. Cl. ..................... 427/282; 427/284; 427/285
(58) Field of Search ................... 427/282, 284, 427/285, 288

(56) References Cited

U.S. PATENT DOCUMENTS

| | | | |
|---|---|---|---|
| 1,853,773 A | * | 4/1932 | McDonough |
| 2,374,678 A | | 5/1945 | Gruenwald |
| 2,691,341 A | * | 10/1954 | Williams |
| 3,894,976 A | | 7/1975 | Kang et al. |
| 3,951,899 A | | 4/1976 | Seiner |
| 3,959,224 A | | 5/1976 | Coleman |
| 4,045,393 A | | 8/1977 | Krevenas et al. |
| 4,521,489 A | | 6/1985 | Rehfuss et al. |
| 4,792,357 A | | 12/1988 | Bier |
| 5,055,317 A | * | 10/1991 | Hoffman et al. |
| 5,510,409 A | | 4/1996 | Romano |
| 5,700,522 A | | 12/1997 | Nonweiler et al. |
| 5,733,596 A | * | 3/1998 | Arrington |
| 5,775,397 A | * | 7/1998 | Lippincott |
| 6,013,721 A | | 1/2000 | Schall et al. |
| 6,069,189 A | | 5/2000 | Kramer et al. |

* cited by examiner

*Primary Examiner*—Fred J. Parker
(74) *Attorney, Agent, or Firm*—Christensen O'Connor Johnson Kindness PLLC

(57) ABSTRACT

The invention is a method for applying a stable, labeling paint suitable for use on an OSB finishing line in conjunction with metal stencils. The labeling paint is water-based and can include opacifying agents, viscosity enhancing agents, surfactants, a polymeric binding agent with a glass transition temperature that is greater than about 25° C., and a debonding agent, which is active on metal surfaces.

18 Claims, No Drawings

LABELING PAINT FOR USE WITH METALLIC STENCILS ON ORIENTED STRANDBOARD FINISHING LINE

CROSS-REFERENCE TO RELATED APPLICATIONS

This application is a divisional of copending U.S. patent application Ser. No. 09/829,508, filed Apr. 9, 2001, which claims the benefit of U.S. Patent Application No. 60/207,085, filed May 25, 2000.

FIELD OF THE INVENTION

The present invention relates to a labeling paint composition.

BACKGROUND OF THE INVENTION

Most manufacturers of oriented strandboard (OSB) panels in North America use a common practice of bundling and packaging multiple panels into units in preparation for shipment to distributors, retailers and lumberyards. Units are composed of a stack of about 40 to 100 panels. Typically the individual panels are 4 feet wide, and 8 feet or 16 feet long. Individual panel thickness values range between 0.225 inch to 1.25 inches. Most units are between 3 to 4 feet in height and so the number of panels in a unit is largely determined by the thickness of the individual panels.

OSB units are typically subjected to a finishing process that generally includes three steps:

1) Units are transported into a booth where the four sides of the unit are sprayed with a liquid edge sealant, which dries to form a hydrophobic coating that helps to reduce edge thickness swell if the panels are exposed to rain at construction site. Quite often the liquid edge sealant is colored to visually differentiate the product in the marketplace.

2) The sealed unit is strapped to secure the bundle during shipping and storage.

3) The sealed and strapped unit is labeled (e.g., stenciled) to designate the panel manufacturer, as well as the number, type and size of panels in the unit. Labeling is usually done in one of two ways. Units based on the most premium panels are often wrapped in a high-basis weight packaging paper that has a sophisticated, highly decorative label printed on the outside. The packaging paper serves a protective as well as a labeling function, and in some cases this combination of attributes has been worth the added cost. Most OSB units are not wrapped in packaging material, but are instead labeled with a relatively simple stencil and paint system.

In the stencil and paint labeling system, a stencil is placed against the side of a sealed and strapped OSB unit and paint is sprayed through the stencil onto the side of the unit. Generally the stencil is composed of steel or aluminum and is designed to create images of letters, numbers, and company logos or icons on the side of the unit. Some of these designs can be bit intricate, especially around the letters and numbers. The metal around these intricate areas generally exists as narrow, strips, which are delicate and will bend or break with excessive mechanical stress.

Conventional labeling paint for an OSB finishing line, such as High-Hide White Stencil Paint, which is produced by Associated Chemists Inc. (ACI) [Portland, Oreg.], has a color that sharply contrasts with the color of the edge sealant. Effective contrasting color selection of the edge sealant and stencil paint provides a visually appealing, dramatic appearance to the unit.

Conventional labeling paints are designed to be very low in viscosity in order to improve the atomization properties of the paint at low spray pressure settings. Low spray pressure settings are generally used to minimize the amount of overspray that accumulates on the stencil. The low viscosity of conventional labeling paint makes it very prone to dripping. Accumulated overspray on the stencil often drips into some of the intricate stencil voids where it dries and occludes the opening. To cope with this dripping problem, operators on the OSB finishing line are generally forced to clean the stencil once every 20 to 25 minutes. Unfortunately, conventional labeling paint forms a strong bond to the metal as it dries and operators must scrape with considerable force in order to remove it. Eventually, the harsh scraping action destroys the most delicate parts of the stencil.

Accordingly, there exists a need for a better labeling paint for an OSB finishing line. The ideal labeling paint has the following attributes:

1) Regulatory compliance: The labeling paint is water-based and should not contain any highly toxic or hazardous components.

2) Formulation stability: The labeling paint should not exhibit any phase separation or sediment formation during storage (the ACI labeling paint exhibits gross sediment formation unless it is frequently agitated).

3) Sprayability: The labeling paint is readily atomized in a spray system and should be resistant to nozzle clogging.

4) Bleed resistance with edge sealant: Usually, the edge sealant is still wet when the labeling paint is applied over it. Because these materials typically have sharply contrasting colors, it is important that they do not bleed into each other.

5) Ability to wet-out edge sealant: The edge sealant generally contains a high level of waxes and it becomes very hydrophobic as it dries. The labeling paint must wet-out the surface of the edge sealant and develop adequate bond strength to the edge sealant as it dries.

6) No dripping: The labeling paint should not drip into the openings (e.g., letters or numbers) on the stencil prior to drying.

7) Weak bond to metal stencil: The labeling paint must form a very weak bond to the metal stencil in order to ensure its easy removal from the stencil.

SUMMARY OF THE INVENTION

The present invention is a stable, labeling paint suitable for use on an OSB finishing line in conjunction with metal stencils. The labeling paint is typically applied to the side of units at spread rates of about 50 to about 300 g/m². The labeling paint overspray that accumulates on the stencil is highly resistant to dripping and dries to form a soft film that has sufficient bond strength to the edge sealant. The labeling paint is easily removed from the metal stencil even after excessive drying times. The labeling paint is water-based and can include opacifying agents, viscosity enhancing agents, surfactants, a polymeric binding agent with a glass transition temperature that is greater than about 25° C., and a debonding agent, which is active on metal surfaces.

DETAILED DESCRIPTION OF THE PREFERRED EMBODIMENT

The present invention provides a stable, water-based, labeling paint suitable for use on an OSB finishing line in conjunction with metal stencils. The paint exhibits no sediment formation or phase separation for about at least two months when stored in a closed container at a temperature of about 20° C. The paint can be transferred from a reservoir into a spray gun with conventional pumps and hoses. The paint will not clog nozzles even after extended stop-and-start run times. The paint is typically applied to the side of units of OSB at spread rates of about 50 to about 300 g/m², and at these spread rates it does not bleed excessively into previously applied wet edge sealant. The paint adequately wets-out the surface of previously applied edge sealant and forms a bond with the edge sealant that is sufficient for normal field conditions. The paint is highly resistant to dripping on the stencil, and it is easily removed from the stencil even after excessive drying times of about 24 hours.

The labeling paint is water-based and contains coloring and/or opacifying agents, at a combined level of about 0.5 to about 35% by weight of the formulation; viscosity enhancing agents at a level of about 0.5 to about 10% by weight of the formulation; surfactants at a level of about 0.5 to about 5% by weight of the formulation; a polymeric binding agent at a level of about 3 to about 30% by weight of the formulation; and a debonding agent, which is active on metal surfaces, at a level of about 10 to about 50% by weight of the formulation. The paint can also contain preservatives, optical brighteners, plasticizers, dispersing aids, coalescing agents, and defoaming agents. Titanium dioxide is a preferred opacifying agent. Viscosity enhancing agents are exemplified by soluble nonionic polysaccharides, such as hydroxyethylcellulose or carboxymethylcellulose; however, suspended particle-type viscosity enhancing agents, such as fumed silica may also be used in this invention. Nonionic and anionic surfactants can be used in this formulation. A highly preferred anionic surfactant class is based on the salts derived from morpholine and long-chain carboxylic acids, such as stearic acid, palmitic acid, or myristic acid. Suitable polymeric binding agents include latices with glass transition temperatures that are greater than about 25° C. A highly preferred polymeric binder is a latex based on a copolymer of butylacrylate and methyl methacrylate with a glass transition temperature of about 32° C. and a pH from about 8 to about 9. Effective debonding agents include vegetable oils such as soybean oil, corn oil, sunflower oil, castor oil, rapeseed oil, linseed oil, sunflower seed oil, or safflower oil. Soybean oil is highly preferred for its low odor, low color, availability, and low cost. Silicone oils can also be used as debonding agents.

EXAMPLE

A representative labeling paint was prepared as follows. A 200-liter primary mixing vessel was charged with warm water (50° C., 22.50 kg) and a hydroxyethylcellulose powder, known as NATROSOL 250 MBR [Herculese, Inc.; Hopewell, Va.] (250 g). The components were agitated by use of a Cowles disperser (6 inch blade, 1000 rpm) for a period of 30 minutes. A 50% morpholine solution (aq) (800 g) was added to the primary mixing vessel and the contents were agitated by use of the Cowles disperser (6 inch blade, 100 rpm) for an additional five minutes. A preservative, known as DOWICIL 75 [DOW Chemical Inc.; Midland, Mich.] (40 g) was added to the primary mixing vessel and the contents were agitated by use of the Cowles disperser (6 inch blade, 100 rpm) for an additional five minutes. A dispersing aid, known as SURFYNOL 104PA [Air Products and Chemical Corp.; Allentown, Pa.] (300 g) was added to the primary mixing vessel and the contents were agitated by use of the Cowles disperser (6 inch blade, 100 rpm) for an additional five minutes. A titanium dioxide powder, known as TRONOX CR-826 [Kerr-McGee Chemical Corp.; Oklahoma City] (17.50 kg) was added to the primary mixing vessel and the contents were agitated by use of the. Cowles disperser (6 inch blade, 100 rpm) for an additional 30 minutes. A warm oil mixture (65° C., 21.00 kg) was added to the primary mixing vessel and the contents were agitated by use of the Cowles disperser (6 inch blade, 100 rpm) for an additional 10 minutes. The oil mixture was comprised of a homogenous blend of soybean oil [Archer Daniels Midland Co.; Red Wing, Minn.] (81.67% by weight); a mixture of hydrogenated fatty acids, known as PRISTERENE 4910 [Unichema International; Chicago, Ill.] (13.33% by weight); 1-octadecanol [Proctor and Gamble; Cincinnati, Ohio] (1.67% by weight); and a poly(propylene glycol), average MW=1050 Da, known as PLURACOL P1010 [BASF Corp.; Wyandotte, Mich.] (3.33% by weight). Warm water (36° C., 13.81 kg) was added to the primary mixing vessel and the contents were manually agitated by use of a paddle in a gentle fashion until the mixture appeared to be homogenous. An acrylic latex, known as CS-4000 [Rohm and Haas Co.; Philadelphia, Pa.] (12.40 kg) was added to the primary mixing vessel and the contents were manually agitated by use of a paddle in a gentle fashion until the mixture appeared to be homogenous. A defoaming agent, known as SURFYNOL DF-210 [Air Products and Chemical Corp.; Allentown, Pa.] (400 g) was added to the primary mixing vessel and the contents were manually agitated by use of a paddle in a gentle fashion until the mixture appeared to be homogenous. A coalescing agent, known as TEXANOL [Eastman Chemical Co.; Kingsport, Tenn.] (11.00 kg) was added to the primary mixing vessel and the contents were manually agitated by use of a paddle in a gentle fashion until the mixture appeared to be homogenous. The formulation was then filtered through a 20 mesh filter and slowly cooled to 20–25° C.

The labeling paint prepared as described above had a pH value of 8, a percent solids value of 44 to 45, and a specific gravity of 1.09 to 1.13. The Hegman particle size test value was 7+. The Brookfield viscosity value was 5000 cps at a temperature of 24° C. (RVF #7, 50 rpm). An aliquot of the formulation was stored without agitation in a closed container at a temperature of about 20 to about 25° C. for about two months and no sediment formation or phase separation were observed. The color of the formulation was bright white and the odor was slight and pleasant.

The labeling paint described above was shipped to an OSB mill [Weyerhaeuser Co.; Grayling, Mich.] and utilized on the finishing line in place of a conventional labeling paint [High-Hide While Stencil Paint; Associated Chemists Inc.; Portland, Oreg.]. The labeling paint required no agitation in its storage tank, as compared to the High-Hide White Stencil Paint, which required constant agitation. The labeling paint was easily transferred out of its storage tank to a spray gun by use of a 10:1 air motor piston pump. The labeling paint atomized properly as it exited the spray gun. Fewer nozzle clogs per day were reported with the labeling paint than typically observed with the High-Hicle White Stencil Paint. The labeling paint did not bleed into the freshly applied green edge sealant on the side of the OSB units, but it did wet-out the surface of the freshly applied green edge sealant in a manner that was sufficient to permit bonding. The edge sealant being used in conjunction with the labeling paint was known as PF6014-34 [Associated Chemists Inc.; Portland, Oreg.]. The visual contrast between the bright white images formed by the labeling paint and the dark green edge sealant as background on the side of the units was dramatic and aesthetically pleasing. The labeling paint that accumulated on the aluminum stencil did not drip into the lettering or logo voids. The operators were able to run the finishing line without cleaning the stencil for four hours at a time. The operators reported that they generally needed to stop and clean the stencil with the High-Hide White Stencil Paint once every 20 to 25 minutes. When the operators did stop to clean the stencil they reported that the labeling paint was much easier and faster to remove than the High-Hide White Stencil Paint. The bond between the dried labeling paint and the stencil was very weak. The labeling paint tended to peal off of the stencil in large sheets and it left a very thin oily residue on the surface of the metal. Overall, the finishing line operators expressed a strong preference for the labeling paint.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for labeling an oriented strandboard panel bundle, comprising:
   (a) placing a metal stencil having openings therein against a side of an oriented strandboard panel bundle, wherein the bundle comprises a stack of oriented strandboard panels, wherein the side of the bundle comprises a plurality of panel edges, and wherein the openings of the stencil placed against the side of the bundle provides exposed panel edges;
   (b) applying a paint composition to the exposed panel edges, wherein the composition comprises:
      (i) an opacifying agent;
      (ii) a viscosity enhancing agent;
      (iii) a surfactant;
      (iv) a polymeric binding agent; and
      (v) a debonding agent active on metal surfaces; and
   (c) removing the stencil from the bundle.

2. The method of claim 1, wherein the composition is applied at a spread rate of from about 50 to about 300 g/m$^2$.

3. The method of claim 1, wherein the opacifying agent comprises titanium dioxide.

4. The method of claim 1, wherein the viscosity enhancing agent comprises hydroxyethylcellulose.

5. The method of claim 1, wherein the surfactant comprises a salt derived from morpholine and a long-chain carboxylic acid.

6. The method of claim 1, wherein the polymeric binding agent comprises a latex having a glass transition temperature greater than about 25° C.

7. The method of claim 6, wherein the latex comprises a copolymer of butylacrylate and methyl methacrylate.

8. The method of claim 7, wherein the copolymer has a glass transition temperature of about 32° C.

9. The method of claim 1, wherein the debonding agent comprises soybean oil.

10. The method of claim 1, wherein the opacifying agent is present in the composition in an amount from about 0.5 to about 35 percent by weight based on the total weight of the composition.

11. The method of claim 1, wherein the viscosity enhancing agent is present in the composition in an amount from about 0.5 to about 10 percent by weight based on the total weight of the composition.

12. The method of claim 1, wherein the surfactant is present in the composition in an amount from about 0.5 to about 5 percent by weight based on the total weight of the composition.

13. The method of claim 1, wherein the polymeric binding agent is present in the composition in an amount from about 3 to about 30 percent by weight based on the total weight of the composition.

14. The method of claim 1, wherein the debonding agent is present in the composition in an amount from about 10 to about 50 percent by weight based on the total weight of the composition.

15. A method for labeling a wooden panel bundle, comprising:
   (a) placing a metal stencil having opening therein against a side of a wooden panel bundle, wherein the bundle comprises a stack of wooden panels, wherein the side of the bundle comprises a plurality of panel edges, and wherein the openings of the stencil placed against the side of the bundle provides exposed panel edges;
   (b) applying a paint composition to the exposed panel edges, wherein the composition comprises a debonding agent active on metal surfaces; and
   (c) removing the stencil from the bundle.

16. The method of claim 15, wherein the composition is applied at a spread rate of from about 50 to about 300 g/m$^2$.

17. The method of claim 15, wherein the debonding agent comprises soybean oil.

18. The method of claim 15, wherein the debonding agent is present in the composition in an amount from about 10 to about 50 percent by weight based on the total weight of the composition.

* * * * *